United States Patent

[11] 3,595,080

| [72] | Inventor | George C. Rannenberg<br>Granby, Conn. |
|---|---|---|
| [21] | Appl. No. | 773,495 |
| [22] | Filed | Nov. 5, 1968 |
| [45] | Patented | July 27, 1971 |
| [73] | Assignee | United Aircraft Corporation<br>East Hartford, Conn. |

[54] FLOW SENSOR
3 Claims, 1 Drawing Fig.

[52] U.S. Cl.................................................. 73/213
[51] Int. Cl..................................................... G01l 13/02
[50] Field of Search............................................73/213, 205

[56] References Cited
UNITED STATES PATENTS

| 2,507,075 | 5/1950 | Wiegand et al.............. | 73/213 |
| 2,628,086 | 2/1953 | Cutler......................... | 261/69 |
| 2,703,013 | 3/1955 | Wildhack..................... | 73/205 X |
| 2,886,968 | 5/1959 | Johnson et al................ | 73/213 |

Primary Examiner—Richard C. Queisser
Assistant Examiner—Marvin Smollar
Attorney—Norman Friedland ABSTRACT: A mass flow sensor for a compressible fluid applies pressure upstream of the throat of a venturi to one side of the diaphragm and the pressure between three serially connected restrictions leading fluid from a high pressure source to the throat of the venturi to the other side of the diaphragm. The first restriction is made variable and attached to the diaphragm such that the pressure between it and the second restriction is regulated so that said intermediate pressure is proportional to the mass flow through the venturi.

PATENTED JUL 27 1971 3,595,080
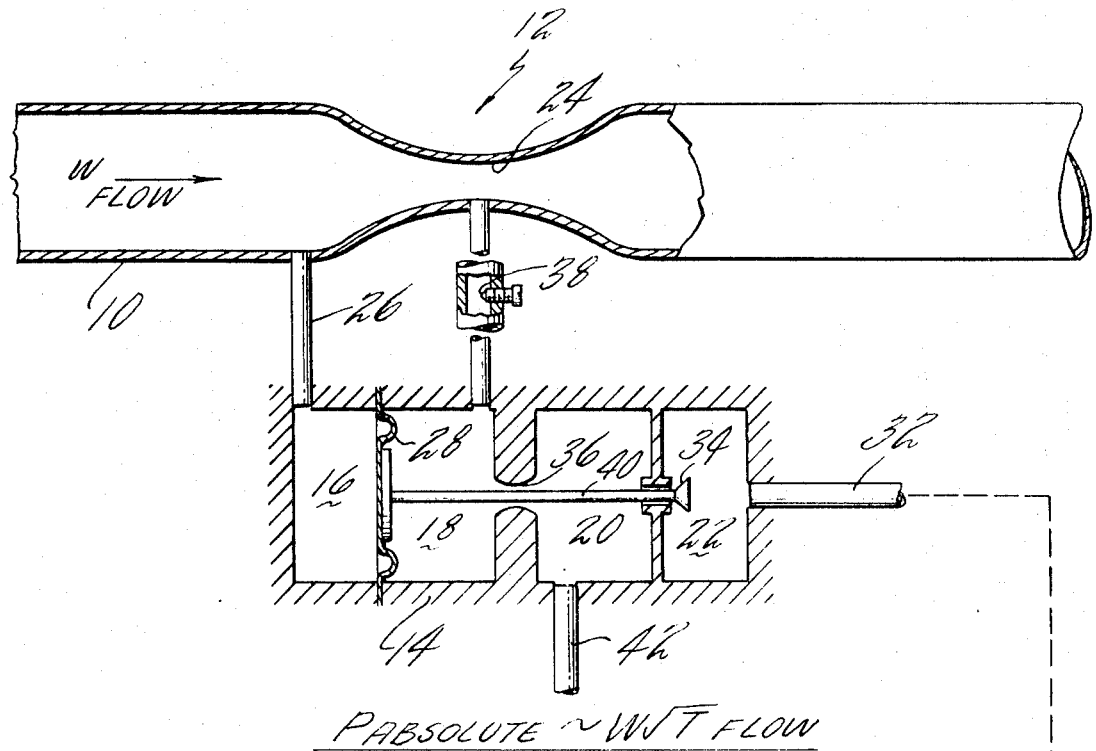
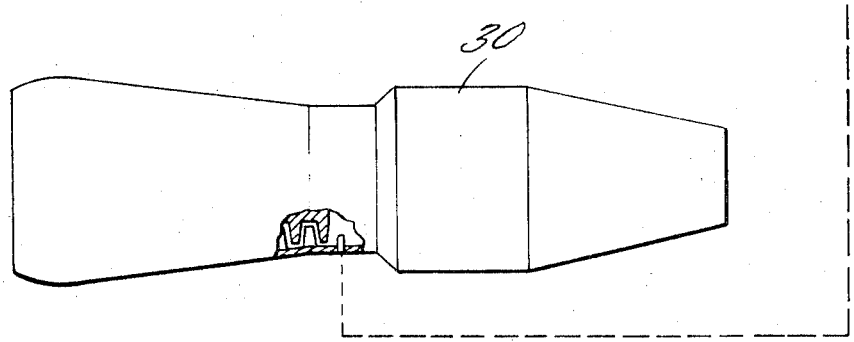
INVENTOR
GEORGE C. RANNENBERG
BY Norman Friedland
ATTORNEY

FLOW SENSOR

BACKGROUND OF THE INVENTION

This invention relates to mass flow sensors and particularly to a sensor that produces a pressure signal which is a function of mass flow.

A typical mass flow sensor of the type that produces an intermediate pressure proportional to mass flow, bleeds air from the flow line passing it through restrictions and dumps the flow out of the system with a consequential loss of fluid. Inasmuch as the fluid bled off is continuous the losses in certain applications cannot be tolerated. In the heretofore known sensors considerable difficulty is experienced in maintaining the low pressure restriction "choked" which seriously limits its usefulness in low pressure applications. It is usually necessary to provide an ejector pump or other suction device to lower the pressure downstream thereof. I have found that where there is a high-pressure source available I can obtain a pressure signal proportional to the mass flow by feeding the flow from the high-pressure source through serially connected restrictions into the duct line being sensed rather than to an external low-pressure, thus avoiding the loss of fluid and eliminating the need of an ejector pump, and making this type of sensor useful in many applications where a low external pressure is not available.

SUMMARY OF INVENTION

A primary object of the present invention is to provide an improved mass flow sensor for compressible fluid.

In accordance with this invention pressure upstream of the throat of the venturi is applied against one end of the diaphragm and compared with pressure modulated through three restrictions in series which passes flow from a high-pressure source to the throat of the venturi.

BRIEF DESCRIPTION OF DRAWING

The sole FIGURE is a schematic illustration of the present invention which comprises a duct 10 having connected thereto a venturi generally illustrated by numeral 12 for measuring the mass flow passing through the duct.

The mass flow sensor comprises a housing 14 divided into four chambers 16, 18, 20, and 22. Pressure upstream of the throat 24 of venturi 12 is fed into chamber 16 via line 26 where it acts upon one face of diaphragm 28. Flow from a suitable high-pressure source which may be a jet engine generally illustrated by numeral 30 is fed through pipeline 32 into chamber 22 where it passes to the throat 24 of the venturi through variable restriction 34, fixed restriction 36 and fixed restriction 38. Variable restriction 34 is controlled by rod 40 having one end suitably attached to diaphragm 28. As will be appreciated from the description hereinbelow, variable restriction 34 serves to maintain the pressure drop across fixed restriction 36 and 38 such that the flow therethrough is proportional to the pressure in chamber 20. Valve element 34 will restrict the flow through variable restriction 34 so that the pressure in chamber 16 equals the pressure in chamber 18 when in the null position. When in the null position, the mass flow ($W\,T$); where $W$ is pounds per unit time and $T$ is temperature absolute in either the Kalvin or Rankine scale) through orifice 38 is proportional to the flow in venturi 12, since both are subject to the same pressure drop. Restriction 36 is sized and shaped to be always in the choked condition so that pressure in compartment 20 will always be proportional to the flow through orifices 36 and 38 and accordingly be proportional to the flow through the sensing venturi 12. Thus, the pressure in chamber 20 which can be utilized for any suitable output device, say for example, for maintaining the flow through the duct at a given mass flow may be picked off by line 42. This signal is therefore proportional to $W\,T$ or mass flow, it being noted that no evacuated bellows are required and that the unit is not pressure sensitive except for the Reynolds No. effect.

While it can be shown by a rigorous mathematical derivation that the mass flow is proportional to absolute pressure in line 42, a simplified explanation is all that is necessary to show that this is the case.

1. $P_{16}=P_{18}$, where
    $P$ = pressure and the subscript numerals correspond to the reference numerals in the sole FIGURE Obviously:

2. $P_{16}-P_{24}=P_{18}-P_{24}$

Because the same $P$ and $\Delta P$ are across both the duct 10 and the sensor the following expression can be written $$(3) \quad \frac{W_{duct}\sqrt{T_{duct}}}{W_{sensor}\sqrt{T_{sensor}}}=K$$

where $K=a$ constant

Therefore measurement of $W_{sensor}\,T_{sensor}$, when suitably calibrated, is equal to $W_{duct}\,T_{duct}$ Since restriction 36 is always choked, $$(4) \quad \frac{W_{sensor}\sqrt{T_{sensor}}}{A_{36}P_{20}}=K$$

or
$W_{duct}\sqrt{T_{duct}} \approx W_{sensor}\sqrt{T_{sensor}} \approx KA_{36}P_{42}$
and $A_{36}$ is fixed so
$P_{42} \approx W_{duct}\sqrt{T_{duct}}$.

It should be understood that the invention is not limited to the particular embodiments shown and described herein, but that various changes and modifications may be made without departing from the spirit or scope of this novel concept as defined by the following claims.

I claim:

1. A mass flow sensor for producing a signal indicative of the mass flow of a compressible fluid stream where there is a high-pressure source available comprising, in combination, a venturi disposed in said compressible fluid stream, a casing defining a cavity, resilient means dividing said cavity into a pair of subchambers, wall means extending into said casing for subdividing said cavity into additional subchambers, said subchambers being in alignment, valve means adjacent an opening in a first of said wall means to form a variable orifice, another opening in a second said wall means defining a fixed restriction disposed between said resilient means and said variable orifice, connecting means interconnecting said high-pressure source and the throat of said venturi for leading high-pressure fluid serially from said high-pressure source, through said variable orifice, said fixed restriction, one of said pairs of subchambers defined by said resilient means, and into said throat, an additional fixed restriction disposed in said connecting means between said fixed restriction and said throat, a connecting rod interconnecting said valve means and said resilient means, the pressure in said subchambers adjacent said resilient means adjusts said resilient means and said variable orifice so as to maintain the resilient means at a balanced condition and thereby defining a pressure between said fixed and variable orifice indicative of the mass flow of said fluid stream.

2. A mass flow sensor as claimed in claim 1 wherein said resilient means is a diaphragm.

3. A mass flow sensor as claimed in claim 1 wherein said casing includes an inlet and an outlet, said connecting means includes a conduit interconnecting said outlet and the throat of said venturi, another conduit interconnecting said inlet and said source of high pressure, said outlet being disposed in the subchambers defined by the wall having a fixed restriction and the said resilient means, said inlet being disposed in the subchamber defined by the wall having the variable orifice and a fixed restriction disposed in said conduit interconnecting said outlet and the throat of the venturi.